United States Patent [19]
Rosenberg et al.

[11] Patent Number: 6,073,241
[45] Date of Patent: Jun. 6, 2000

[54] APPARATUS AND METHOD FOR TRACKING WORLD WIDE WEB BROWSER REQUESTS ACROSS DISTINCT DOMAINS USING PERSISTENT CLIENT-SIDE STATE

[75] Inventors: Jonathan Rosenberg, Annandale; Munish Gandhi, Bridgewater; Andrew Werth, Scotch Plains, all of N.J.

[73] Assignee: C/Net, Inc., San Francisco, Calif.

[21] Appl. No.: 08/705,396

[22] Filed: Aug. 29, 1996

[51] Int. Cl.[7] .................................................. G06F 13/00
[52] U.S. Cl. ............................................................ 713/201
[58] Field of Search ............................... 395/187.01, 186, 395/188.01, 200.54, 200.59, 200.33; 380/216, 229, 232, 239, 241

[56] References Cited

U.S. PATENT DOCUMENTS

| | | | |
|---|---|---|---|
| 4,688,169 | 8/1987 | Joshi | 364/200 |
| 5,751,956 | 5/1998 | Kirsch | 395/200.33 |
| 5,796,952 | 8/1998 | Davis et al. | 709/224 |
| 5,869,819 | 2/1999 | Knowles et al. | 235/335 |
| 5,889,860 | 3/1999 | Eller et al. | 380/4 |
| 5,918,014 | 6/1999 | Robinson | 709/219 |

*Primary Examiner*—Robert W. Beausoliel, Jr.
*Assistant Examiner*—Pierre E. Elisca
*Attorney, Agent, or Firm*—William S. Galliani; Pennie & Edmonds LLP

[57] ABSTRACT

A method of tracking a web browser across distinct domains of a network of computers includes the step of identifying, at a first server computer with a first domain name, a first request from the web browser. The web browser is then assigned a unique identification code. The unique identification code is then conveyed to a second server with a second domain name that is distinct from the first domain name. A request by the web browser to the second server computer is associated with the web browser via the unique identification code. In this way, the web browser is tracked across distinct domains of the World Wide Web. As a result, the web browser can be passively tracked to identify content preferences and interests associated with the individual using the web browser.

22 Claims, 6 Drawing Sheets

Figure 3

| Cookie ID # | Last Visit to Server_A | Content Requested | | | Last Visit to Server_B | Content Requested | | |
|---|---|---|---|---|---|---|---|---|
| | | News | Product Info | Feature Story | | News | Product Info | Feature Story |
| 123 | 4-9-96;18:25 | 2 | 5 | 0 | 7-4-96;16:23 | 1 | 7 | 3 |

Figure 5

| ID#1 | ID#2 | Last Visit to Server_A | Content Requested | | | Last Visit to Server_B | Content Requested | | |
|---|---|---|---|---|---|---|---|---|---|
| | | | News | Product Info | Feature Story | | News | Product Info | Feature Story |
| 123 | 456 | 1-30-96;06:25 | 4 | 0 | 0 | 10-4-96;18:02 | 2 | 0 | 9 |

| ID#1 | ID#2 | Last Visit to Server_A | Content Request | Last Visit to Server_B | Content Request | Name | Password | Demo Info |
|---|---|---|---|---|---|---|---|---|
| | | | | | | | | |

Figure 7

APPARATUS AND METHOD FOR TRACKING WORLD WIDE WEB BROWSER REQUESTS ACROSS DISTINCT DOMAINS USING PERSISTENT CLIENT-SIDE STATE

BRIEF DESCRIPTION OF THE INVENTION

This invention relates generally to the World Wide Web of computers. More particularly, this invention relates to a technique of tracking an individual browser as it makes requests to distinct domains within the World Wide Web of computers.

BACKGROUND OF THE INVENTION

The World Wide Web (WWW) of computers is a large collection of computers operated under a client-server computer network model. In a client-server computer network, a client computer requests information from a server computer. In response to the request, the server computer passes the requested information to the client computer. Server computers are typically operated by large information providers, such as commercial organizations, governmental units, and universities. Client computers are typically operated by individuals.

To insure inter-operability in a client-server computer network, various protocols are observed. For example, a protocol known as the Hypertext Transfer Protocol (HTTP) is used to move information across the WWW. In addition, the WWW observes a standard, known as Hypertext Markup Language (HTML), for organizing and presenting information.

The HTTP and HTML are heavily relied upon to distribute information such as news, product reviews, and literature. This information is typically free to the user, while its cost is underwritten by advertising. As with all advertiser-supported media, it is important to learn as much as possible about the customer. For example, advertisers like to know audience demographics (e.g., average age, gender distribution, etc.) to more accurately choose appropriate advertisements, while editors like to know audience preferences (e.g., favorite kinds of stories, most-read sections) to create more appealing content. This type of information is widely used in today's mass media, including TV, radio, magazines, and newspapers. However, the WWW has the potential for a finer-grained collection of information about customers because point-to-point connections are established between a client computer and a server computer.

There are several existing mechanisms in the HTTP to support the collection of customer information. One mechanism is the voluntary registration process, which involves a customer providing personal information in exchange for access to otherwise restricted media content. Another mechanism is passive tracking, which provides information on the requests made by a customer accessing a web site, the information includes such things as pages visited, data entered, and links clicked. After a voluntary registration process has been completed, HTTP authentication is used for subsequent visits to the same site. In the subsequent visit, the customer avoids the registration process by entering a user name and password. Once the user enters this information, the server computer recognizes the customer. This mechanism supports the collection of both active demographics and passive tracking.

Although authentication provides rich functionality, its use has fallen into great disfavor since users do not want to remember a user name and password for each site requiring authentication. Site managers recognize that the use of authentication discourages users from visiting a site. Thus, it would be highly desirable to provide a mechanism for avoiding authentication operations, while still preserving access to registration data.

A shortcoming also exists in the operation of passive tracking. Passive tracking is typically performed through a mechanism formally referred to as persistent client-side state, and informally referred to as "cookies". Persistent client-side state allows a site (server computer) to store and retrieve information within the web browser that a client computer uses to access the site. The information is effectively un-interpreted by the browser and thus can be used by the server computer for any purpose.

Appropriate use of cookies allows the collection of passive tracking information. In particular, a server stores a unique value in each browser's cookie and makes a corresponding entry in a database for that value. This allows the site, via the embedded cookie value, to associate persistent information with that person. In addition, the server may log the cookie associated with each request. This will allow the association of requests with a person.

Cookies are a general, powerful mechanism for tracking user activity. It is rather straightforward to use cookies to track a user within a single site. Such tracking is useful. However, it would be even more useful to be able to track a user across multiple web sites. This would allow the collection and correlation of additional customer information. Unfortunately, a security feature associated with cookies prevents the tracking of a user across web sites with distinct domain names.

The full cookie specification is described on the WWW at "http://home.netscape.com/newsref/std/cookie_spec.html". The relevant aspects of the cookie specification as it relates to the present invention are described below.

When a server computer returns an HTTP object to a client it may include a piece of state information that the client computer can store. Included in that state object is a description of the range of URLs for which that state is valid. A URL, or Uniform Resource Locator, specifies a computer and a file. A typical URL is http://SU/123. This URL is an instruction to retrieve the file 123 from the State University computer "SU" using the HTTP. A URL may also be used to invoke a specified function on a remote computer, with the remote computer returning the results of the invoked and executed function.

The state information that is passed to the client computer typically observes the following syntax: Set-Cookie: NAME=VALUE; domain=DOMAIN_NAME. The term VALUE is a sequence of characters that is typically used to specify a user identification value. The DOMAIN_NAME specifies the set of domains over which the state information can be accessed. When the browser searches the cookie list for valid cookies, a comparison of the domain attributes of the cookie is made with the internet domain name of the host from which the URL will be fetched. If there is a tail match, then the cookie will go through path matching to see if it should be sent. "Tail matching" means that a domain attribute is matched against the tail of the fully qualified domain name of the host. For example, a domain attribute of "acme.com" would match host names "anvil.acme.com" as well as "shipping.crate.acme.com".

Only hosts (server computers) within the specified domain can set a cookie for a domain. It is this security feature that prevents the tracking of a user across web sites. While site A would like to see the cookie set by site B so that site A can access information about the user's behavior on site B, the domain specification security feature of cookies prevents site A from seeing or manipulating a cookie set by site B, if site A and site B have distinct domain names.

In view of the foregoing, it would be highly desirable to perform passive tracking of a web browser as it makes requests to distinct domain names of the WWW. As indicated above, such information would allow editors and advertisers to tailor their content to users.

SUMMARY OF THE INVENTION

A method of tracking a web browser across distinct domains of a network of computers includes the step of identifying, at a first server computer with a first domain name, a first request from the web browser. The web browser is then assigned a unique identification code. The unique identification code is then conveyed to a second server with a second domain name that is distinct from the first domain name. The unique identification code is conveyed by embedding it in a request from the web browser to the second server computer. A subsequent request by the web browser to the second server computer is associated with the web browser via the unique identification code. In this way, the web browser is tracked across distinct domains of the World Wide Web.

The method of the invention allows a web browser to be passively tracked so that content preferences and interests associated with the individual using the web browser can be identified. In particular, the technique of the invention allows all cooperating servers to share information via a database. The persistent client-side state information can be combined with authentication data in the database to provide demographic information and passive tracking information regarding the individual using the web browser. This cumulative information defines content preferences and demographics associated with the individual using the web browser. This information can be used to provide responses tailored toward the individual using the web browser.

BRIEF DESCRIPTION OF THE DRAWINGS

For a better understanding of the nature and objects of the invention, reference should be made to the following detailed description taken in conjunction with the accompanying drawings, in which:

FIG. 3 is an example of a passive tracking data structure that may be used in accordance with an embodiment of the invention.

FIG. 5 is an example of a data base data structure that may be used in accordance with an embodiment of the invention.

FIG. 7 illustrates a data base data structure, with authentication data, which may be used in accordance with an embodiment of the invention.

Like reference numerals refer to corresponding parts throughout the several views of the drawings.

DETAILED DESCRIPTION OF THE INVENTION

Figure 1:
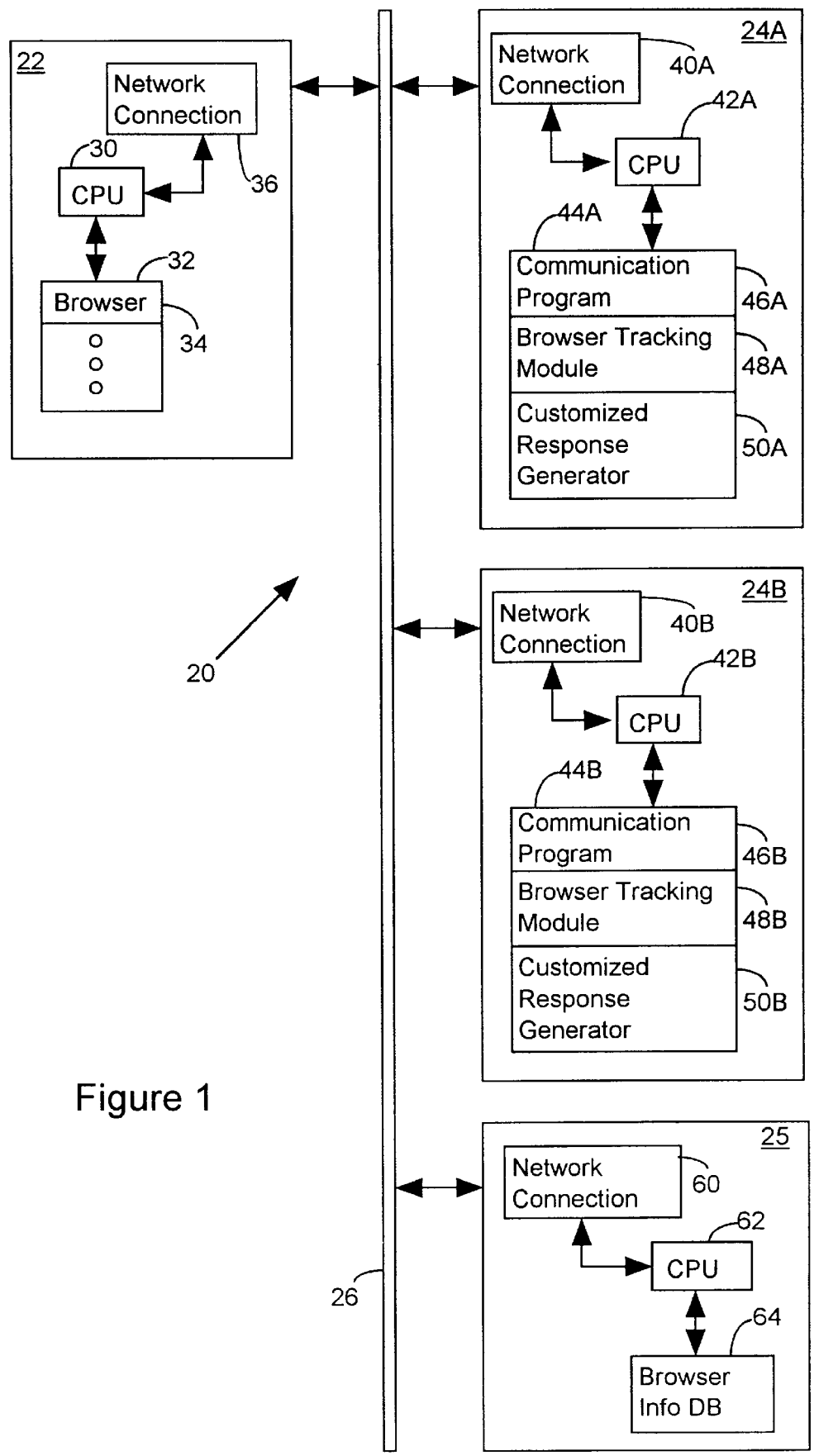
FIG. 1 illustrates a client-server computer network constructed in accordance with an embodiment of the invention.

FIG. 1 illustrates a client-server computer network 20 that may be operated in accordance with an embodiment of the present invention. The computer network 20 may be considered as a simplified representation of the WWW. The network 20 includes at least one client computer 22 and at least one server computer 24. The client computer 22 and the server computer 24 are connected by a transmission channel 26, which may be any wire or wireless transmission channel.

The client computer 22 is a standard computer including a Central Processing Unit (CPU) 30 connected to a memory (primary and/or secondary) 32. The memory 32 stores a number of computer programs, including a web browser 34. As known in the art, a web browser is used to communicate with remote server computers 24 and to visually present the information received from such computers. The client computer 22 establishes network communications through a standard network connection device 36.

FIG. 1 illustrates two server computers 24A and 24B, although a typical embodiment of the invention would include a larger number of server computers, say server computers 24A through 24N. FIG. 1 also illustrates a separate server computer 25 that is used as a database server. The database function, which is described below, may be performed on another server, say server computer 24A, even though it is illustrated in FIG. 1 as operating on a separate server 25.

The server computer 24A includes standard server computer components, including a network connection device 40A, a CPU 42A, and a memory (primary and/or secondary) 44A. The memory 44A stores a set of computer programs to implement the processing associated with the invention. In particular, the memory 44A stores a standard communication program 46A to realize standard network communications. The memory 44A further includes a browser tracking module 48A. As will be described below, the browser tracking module 48A is used to passively track browsers across distinct domains. The module 48A further serves to obviate the need for authentication or registration in selected circumstances, as will be discussed below.

The memory 44A also includes a customized response generator 50A. The customized response generator 50A relies upon the passive tracking information accumulated by the invention and/or the active demographic data available in accordance with the invention to prepare customized responses to browser inquiries.

The server computer 24B has a configuration similar to that of server computer 24A. Additional server computers (not shown) on the network 20 are similarly configured. The database server 25 has a similar configuration, including a network connection circuit 60, a CPU 62, and a memory 64 including a browser, information database program 64, among other programs.

The present invention operates by having a group of related server computers, say server computers 24A–24N, cooperatively observe a common protocol, which is described below. The common protocol relies upon a common database of information, such as that available in server computer 25. By observing the common protocol, the group of server computers can track web browsers across distinct domains. That is, in accordance with the invention, persistent client-side state (cookie) security features are avoided to allow cooperating server computers with distinct domain names to process state information associated with a browser. An embodiment of the invention is described in reference to FIG. 2.

Figure 2:
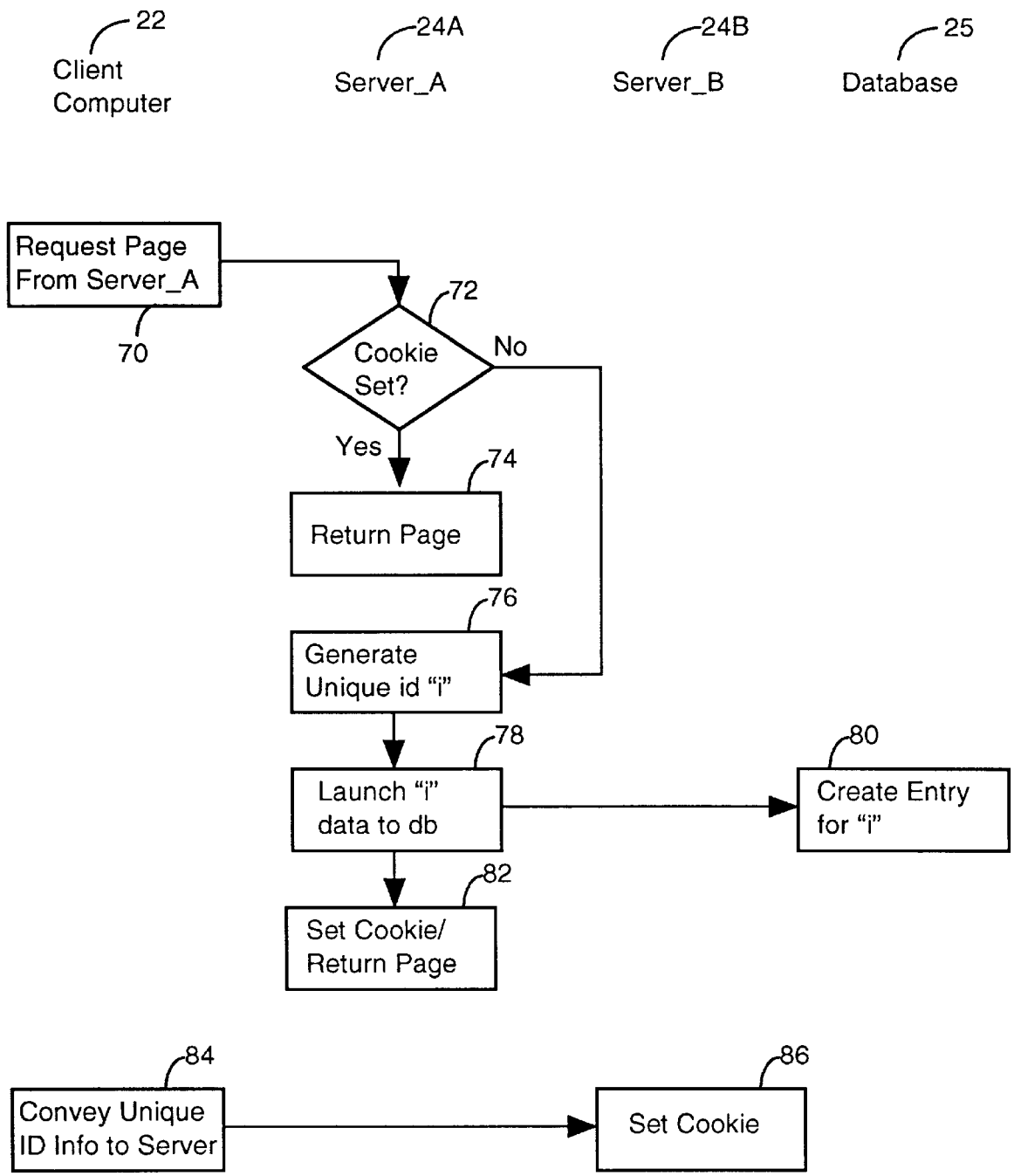
FIG. 2 illustrates processing operations in accordance with an embodiment of the invention.

The top of FIG. 2 illustrates a client computer 22, a server_A computer 24A, a server_B computer 24B, and a database 25. The operations performed by each of these elements is described beneath them. The first processing step is for the client computer 22, and in particular a browser 34 operating on the computer 22, to request a page of information from a first server (step 70), in accordance with known techniques. The server 24A receives the request and determines if it has set a cookie for this browser (step 72). If so, the requested page is simply returned (step 74), in accordance with prior art techniques. If not, the server 24A generates a unique identification value "i" (step 76). The unique identification value is then launched to a database (step 78). The database 25 then creates an 20 entry for the unique identification value (step 80). As shown in FIG. 1, the database 25 is accessible by each server computer 24 in the network. Thus, the data associated with the unique identification value "i" is accessible by each server computer 24 in the network.

The next processing step shown in FIG. 2 is to set a cookie corresponding to the unique identification value and return a page of the requested information (step 82). In general, the setting of a cookie (persistent client-side state information) is a known process. However, in accordance with the invention, the returned page includes instructions to convey the unique identification information to additional server computers that are observing the same protocol. That is, as shown in FIG. 2, the client computer 22 receives the returned page from the server 24A. The header of the returned page includes the cookie with the unique identification information. In addition, the returned page includes an instruction to convey the unique identification information to each server in the network of servers that is operating in accordance with the invention. For the purpose of simplicity, FIG. 2 merely illustrates a single server 24B as receiving the unique identification information. The unique identification information is sent to a specific location at server 243. In other words, the browser 34 receives the information from server 24A. Based upon this information, the browser 34 generates a request to server 24B; the request contains the unique identification information. Different techniques for achieving this operation are discussed below.

Server 24B receives the unique identification information at a specific location that is identified by the browser tracking module 48B. In other words, the browser tracking module 48B includes instructions to read the unique identification value when it is sent to a specific location of the server computer 48B. It further includes instructions to assign this unique identification value as the cookie value for the server 24B. Thus, the server 24B will not generate a unique identification value, but will rely upon the value established by server 24A. If a subsequent request is made to server 24B the processing step 72 of FIG. 2 will be performed. This will result in server 24B returning a page (step 74). At this point, the server 24B uses the cookie (persistent client-side state) information in a standard manner.

FIG. 3 illustrates a data structure that may be used to store information regarding the interaction between a browser 34 and a server 24. Typically, the information associated with this data structure is stored in the access logs of each server computer 24. This information is then passed from the access logs of the server computers 24 to the database 25, typically at the end of a day or at other times when network traffic is light.

The first column of FIG. 3 specifies a "cookie ID #", which is the previously discussed unique identification number. Note that for this single identification number there is an entry for server A and for server B. In particular, the data structure tracks the content requested during the last visit to the server A, which was on Apr. 9, 1996 (4-9-96) at 6:25 p.m. (18:25). In this example, the user of the web browser requested two pages of news and five page of product information. Similar data is available regarding the last visit to server B.

The data structure of FIG. 3 is simplified for the purposes of illustration. A typical data structure includes entries for previous visits, more specific entries regarding content requests, and additional entries for a large number of servers.

Figure 4:
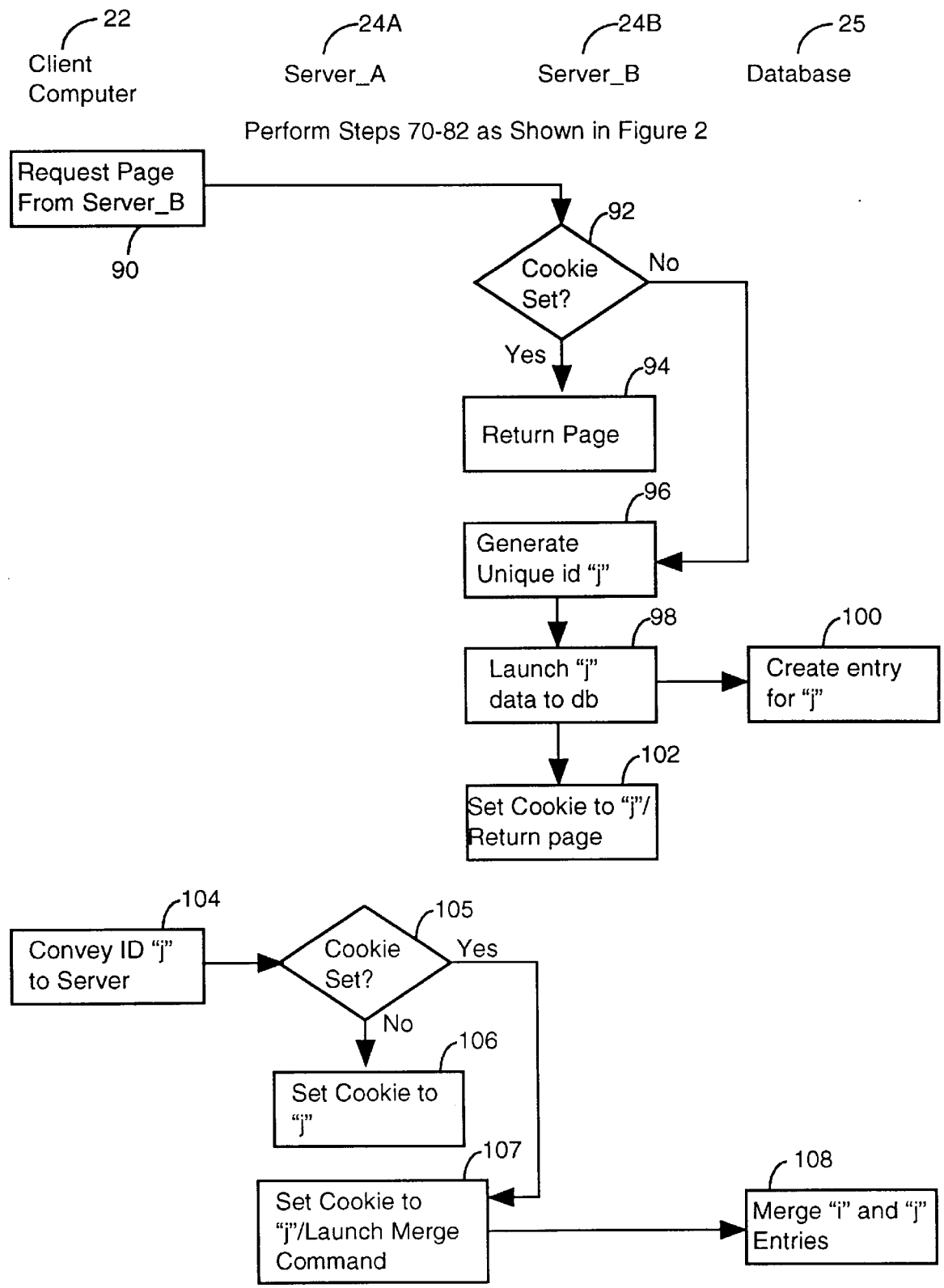
FIG. 4 illustrates processing operations in accordance with an embodiment of the invention.

FIG. 4 illustrates an alternate technique for implementing the invention. As 5 indicated in FIG. 4, steps 70–82 of FIG. 2 are executed. In the process of FIG. 4, the information returned from server 24A includes the unique identification information, but that information does not reach other servers in the network. This may occur if the instruction to pass the unique identification information to other servers is defeated by programming instructions associated with the client computer 22, or the instructions to pass the unique identification information to other servers is defeated by some network interruption. In this case, it is noteworthy that the database still includes an entry for the unique identification value "i" (see step 80).

FIG. 4 illustrates processing steps 90–102, which are consistent with the processing steps 70–82 of FIG. 2. However, in FIG. 4, the processing steps 90–102 are performed by server 24B, instead of server 24A, and the unique identification value generated by server 24B is "j", instead of "i". As shown at step 100, the processing results in a database entry for the "j" identification value. After a cookie value is set to "j", as shown at step 102, the browser 34 of the client computer 22 has a cookie set to "i" and a cookie set to "j". In addition, the setting of the cookie to "j" is accompanied by instructions to convey this unique identification information "j" to other servers in the network This operation is consistent with step 84 described in relation to FIG. 2. Step 104 of FIG. 4 illustrates the browser 34 of computer 22 conveying the unique identification information "j" to server 24A. In FIG. 2, this operation was described as resulting in the setting of a cookie, as shown with step 86. FIG. 4 illustrates a more comprehensive processing approach. In particular, FIG. 4 illustrates the step of determining whether a cookie is set (step 105). If a cookie has not been set, as presumed in the example of FIG. 2, then the cookie is set to "j" and no other action is taken, as shown with step 106 of FIG. 4. On the other hand, if a cookie had been previously set, then the previous value is overwritten with the new "j" value, as shown with step 107. In addition, a merge command is launched to the database 25, also shown with step 107. As shown at step 108, the merge command causes the database 25 to merge the previously separate "i" and "j" entries.

FIG. 5 illustrates a database entry that corresponds to the information of FIG. 3. Note in FIG. 5 that a single entry exists for the identification value "123" and the identification value "456". Only the identification value "123" is used, thereby effectively merging the "i" and "j" entries, as discussed above. As in the case of FIG. 3, the data structure of FIG. 5 is simplified for the purposes of illustration.

Figure 6:
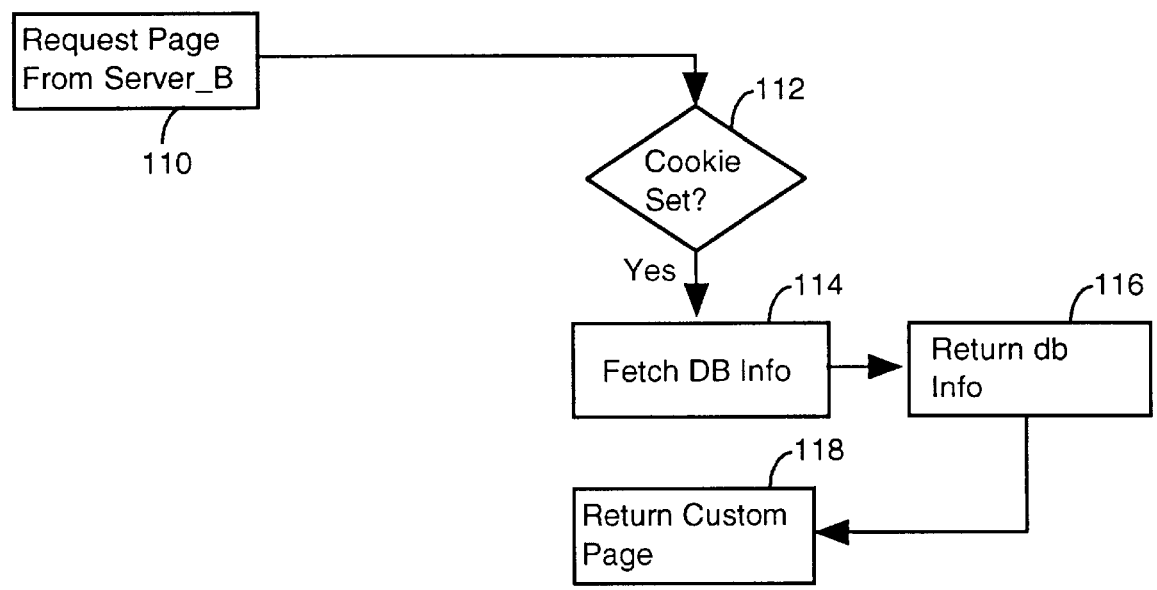
FIG. 6 illustrates processing operations that provide a customized page in accordance with an embodiment of the invention.

FIG. 6 illustrates processing steps that can be used to generate a response that is customized for the browser requesting the page of information. As indicated in FIG. 6, the processing steps 70–86 of FIG. 2 are initially performed. Thereafter, when a subsequent request is made to server B 24B, it is determined that the cookie is already set (step 112). This operations is followed by the step of server B fetching information from the database 25 that is particular to this browser 34.

FIG. 7 illustrates an example data structure that may be used in the database. The data structure includes content request information from previous visits to each server. That is, there is information regarding the last visit to server A and the content requested during that visit, similarly, there is information regarding the last visit to server B and the content requested during that visit. This information is periodically passed from the individual servers 24 to the database 25.

The browser information database program 64 passes this information back to server 24B (step 116). Server 24B interprets this information and return a customized page to the client computer 22 (step 118). For example, if the content information indicates that the individual using the specified browser requests a large amount of product information, the returned page is generated to emphasize product information. This processing is performed with a customized response generator 50, as shown in FIG. 1.

The data structure of FIG. 7 also illustrates a field for a user name, a password, and demographic information. The passive tracking techniques of the invention can be used in conjunction with active demographic information. For example, if an initial request for a page at server A 24A requires an authentication or registration operation where the user must provide a user name, password, and demographic information, then this information is passed to the database 25, along with the unique identification information. The demographic information is then loaded into a data structure of the type shown in FIG. 7. Subsequently, when the same browser visits server B 24B, the individual using the browser is identified using the previously described techniques. Since the browser and its corresponding individual are identified by the database 25, the demographic information for the browser is returned to server B 24B, thereby obviating the requirement that the individual register himself or herself at server B 24B. In other words, the user name, password, and demographic information is automatically passed from the database 25 to server B 24B, without requiring the individual to input this information in an authentication process.

The demographic information may also be used to provide customized responses to page requests. As indicated above, customized responses to page requests may also be based upon the previously discussed passive tracking information.

In sum, the present invention operates by establishing a unique identifier. This unique identifier is then stored as a cookie in the web browser. The unique identifier is then sent to one or more cooperating server computers operating under the same protocol. Each cooperating server that receives the unique identifier sets a cookie based upon the unique identifier. Since the same identifier is used by each server, each server can access the information in the database that is set by other servers. In other words, notwithstanding the cookie security feature described above, the present invention allows servers with distinct domain names to access state information generated by other servers. The invention has now been fully described. Attention presently turns to different techniques that may be used to implement the invention.

As indicated above, the browser tracking module 48A of server computer 24A is used to set a cookie and return a page to a client computer 22. This operation may be executed with the following instructions: "Set-Cookie: NAME=i; domain=server_A." As discussed above, after sending the unique identification value to the database 25, the first server 24A conveys the cookie to a set of related servers, represented in this example as server B 24B. Alternate methods for transmitting this information are described below. When this information is received by server B, server B uses its browser tracking module 48B to identify the value "i" and then to set a server B cookie to the same value. This may be accomplished with the following instructions: "Set-Cookie: NAME=i; domain=server_B'. Note at this time that two cookies are set. Each cookie has the value "i". One cookie is associated with server_A, while the other cookie is associated with server_B.

The browser tracking module 48 creates a page and embeds within it HTML that references a specific URL on another server computer, say server computer B 24B, which is referred to as B-correlate. The URL has the form: "http://B/B-correlate?i'", where i' is an encoding of the identifier "i" (the unique identification information) that is non-trivial to decode without knowing the encoding algorithm. The URL is referred to herein as an HAL cross-site reference. With the present invention, a common protocol is observed by the different server computers, thus, the encoding algorithm is known. The browser tracking module 48A delivers an HTTP header that sets the cookie to "i", followed by the generated page.

Server B 24B must now provide the data that is returned by the request for B-correlate. This data is generated by the browser tracking module 48B. In particular, the browser tracking module 48B extracts the query_string (the data after the "?", in this example, the value "i") from the request and decodes it to yield i. The browser tracking module 48B delivers an HTTP header that sets the cookie to i and returns any additional data that is required.

There are several ways in which an HTML reference to another site can be embedded in a page. Any of these methods can be used to implement the invention. Which method to choose depends on several factors, including the desired appearance of a page, the expected distribution of browsers (i.e., which features are implemented), whether requiring explicit user actions is desirable, etc. Different methods are described below.

An HTML cross-site reference with a hypertext link may be used in accordance with the invention. With this method, the page contains an HTML A tag that has an HREF that refers to the other site. For example, <A HREF="http://www.search.com/cnet.cgi?3676778>. . . <A>.

In this example, the server "search.com" is specified. In particular, the file "cnet.cgi" on server "search.com" is specified. The unique identification value "3676778" is also sent. The problem with this approach is that it requires the user to click on a hypertext link to trigger the request to the other site. In other words, for the unique identification information to be passed to a second server, the user must perform the action of clicking on a hypertext link.

An HTML cross-site reference with a frame tag may also be used. With this method, the page contains frames, one of which references a page on another site. For example, <FRAMESET COLS="1,2">
    <FRAME SRC="http://www.search.com/cnet.cgi?3676778">
    <FRAME SRC=column2.html">
    </FRAME>

An advantage of this approach is that the request will be made automatically, without the need for human action.

An HTML cross-site reference with an HTML form submission tag may also be used. With this method, the page contains a form. When the user submits the form, a program is invoked that performs the appropriate actions. Either a GET or POST method may be used, as follows:

<FORM METHOD=GET ACTION="http://www.search.com/cnet.get.cgi?3676778">or
<FORM METHOD=POST ACTION="http://www.search.com/cnet.post.cgi?3676778">

An HTML cross-site reference with an image tag may also be used. With this method, the page contains an embedded image, which is located on another site. For example, <IMG SRC="http://www.search.com/cnet-img.cgi?47834">

As long as image loading is enabled for the browser, the request will be made automatically, without the need for human action.

An HTML cross-site reference statement with an HTTP redirect command may also be used in accordance with the invention. A redirect command is a response from a server that indicates to the browser that it should retransmit the request to a specific URL. To implement this method, the browser tracking module 48A generates a command such as: "Location: http://B/B-correlate?a'".

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A method of tracking a web browser across distinct domains of a network of computers, said method comprising the steps of:

identifying, at a first server computer with a first domain name, a first request from said web browser;

assigning said web browser a unique identification code;

conveying said unique identification code to a second server computer with a second domain name distinct from said first domain name; and associating a second request from said web browser at said second server computer with said unique identification code.

2. The method of claim 1 wherein said assigning step includes the step of recording said unique identification code as persistent client-side state information.

3. The method of claim 2 further comprising the step of using said second server computer to access persistent client-side state information in said web browser that was established by said first server computer.

4. The method of claim 1 further comprising the step of storing said unique identification code in a database.

5. The method of claim 4 further comprising the steps of:

executing an authentication operation at said first server computer to generate authentication data; and archiving said authentication data in said database.

6. The method of claim 5 further comprising the step of accessing said authentication data in said database with said second server computer such that said second server computer automatically authenticates said web browser.

7. The method of claim 4 further comprising the step of registering visitation activity data of said web browser at said first server computer and said second server computer in said database.

8. The method of claim 7 further comprising the step of creating a customized response for said web browser based upon said visitation activity data.

9. The method of claim 5 further comprising the step of creating on said second server computer a customized response for said web browser based upon said authentication data.

10. The method of claim 1 wherein said conveying step includes the step of specifying said unique identification code and said second domain name in a Hypertext Mark-up Language (HTML) cross-site reference.

11. The method of claim 10 wherein said conveying step includes the step of representing said HTML cross-site reference with a hypertext link.

12. The method of claim 10 wherein said conveying step includes the step of representing said HTML cross-site reference with a frame tag.

13. The method of claim 10 wherein said conveying step includes the step of representing said HTML cross-site reference with an HTML form submission tag.

14. The method of claim 10 wherein said conveying step includes the step of representing said HTML cross-site reference with an image tag.

15. The method of claim 10 wherein said conveying step includes the step of representing said HTML cross-site reference with an HTTP redirect command.

16. A computer readable memory that can be used to direct a client/server computer network to function in a specified manner, comprising:

a first set of instructions, executed at a first server computer with a first domain name, to identify a first request from a web browser of a client computer;

a second set of instructions, executed at said first server computer, to assign said web browser a unique identification code;

a third set of instructions, executed at said first server computer, to direct said client computer to convey said unique identification code to a second server computer with a second domain name distinct from said first domain name; and a fourth set of instructions, executed at said second server computer, to associate a second request from said web browser at said second server computer with said unique identification code.

17. The computer readable memory of claim 16 wherein said second set of instructions includes instructions to record said unique identification code as persistent client-side state information.

18. The computer readable memory of claim 16 further comprising a fifth set of instructions to direct said first server computer to store said unique identification code in a database.

19. The computer readable memory of claim 18 further comprising a sixth set of instructions to execute an authentication operation at said first server computer to generate authentication data, and archive said authentication data in said database.

20. The computer readable memory of claim 19 further comprising a seventh set of instructions, executed on said second server computer, to access said authentication data in said database such that said second server computer automatically authenticates said web browser.

21. The computer readable memory of claim 20 further comprising an eighth set of instructions, executed on said second server computer, to create a customized response for said web browser based upon said authentication data.

22. The computer readable memory of claim 16 wherein said third set of instructions includes instructions to specify said unique identification code and said second domain name in a Hypertext Mark-Up Language (HTML) cross-site reference.

* * * * *